United States Patent [19]
Levin

[11] Patent Number: 5,100,638
[45] Date of Patent: Mar. 31, 1992

[54] METHOD FOR PHOTOCHEMICALLY DECOMPOSING ORGANIC MATERIALS

[75] Inventor: George B. Levin, Mount Lebanon, Pa.

[73] Assignee: Advanced Waste Treatment Technology, Ill.

[21] Appl. No.: 333,092

[22] Filed: Apr. 4, 1989

[51] Int. Cl.⁵ ............................................. C01B 31/02
[52] U.S. Cl. ............................ 423/449; 423/445; 110/346
[58] Field of Search ............... 423/445, 449; 110/346

[56] References Cited

U.S. PATENT DOCUMENTS

| | | | |
|---|---|---|---|
| Re. 31,046 | 10/1982 | Lombana et al. | 110/346 |
| T104,901 | 12/1984 | Cox et al. | 110/346 |
| 1,813,514 | 7/1931 | Schmidt et al. | 110/250 |
| 2,683,652 | 7/1954 | Martin | 422/150 |
| 3,336,884 | 8/1967 | Fix et al. | 422/150 |
| 3,357,376 | 12/1967 | Miller | 110/250 |
| 3,362,887 | 1/1968 | Rodgers | 110/346 |
| 3,575,119 | 4/1971 | Marr | 110/119 |
| 3,648,630 | 3/1972 | Hobbs et al. | 110/346 |
| 3,725,538 | 4/1973 | Brewer | 423/449 |
| 3,903,249 | 9/1975 | Hill et al. | 423/445 |
| 3,933,434 | 1/1976 | Matovich | 423/659 |
| 4,042,334 | 8/1977 | Matovich | 423/659 |
| 4,044,117 | 8/1977 | Matovich | 423/659 |
| 4,056,602 | 11/1977 | Matovich | 423/345 |
| 4,057,396 | 11/1977 | Matovich | 423/345 |
| 4,059,416 | 11/1977 | Matovich | 423/652 |
| 4,071,604 | 1/1978 | Schwemer | 423/445 |
| 4,220,624 | 9/1980 | Austin | 422/150 |
| 4,250,158 | 2/1981 | Solbakken et al. | 423/449 |
| 4,399,756 | 5/1983 | Lientz | 110/346 |
| 4,455,282 | 6/1984 | Marguess et al. | 422/199 |
| 4,456,186 | 6/1984 | Ando | 422/199 |
| 4,667,609 | 5/1987 | Hardison et al. | 110/236 |
| 4,688,495 | 8/1987 | Galloway | 110/250 |
| 4,782,769 | 11/1988 | Lee et al. | 110/246 |

FOREIGN PATENT DOCUMENTS 51-11033  4/1976  Japan .................... 423/445

OTHER PUBLICATIONS

"A Guide To Innovative Thermal Hazardous Waste Treatment Processes," The Hazardous Waste Consultant, May/Jun. 1988, pp. 4–12, 4–20.

"Mobile High-Temperature Fluid-Wall (HTFW) Reactor".

"The High-Temperature Fluid-Wall Reactor an Alternative Thermal Device," by R. L. Litzenberg and E. Matovich, Sep. 1981.

An untitled report identified as "c201.0345(1) TRC 078 File", p. 9.

"Unique Reactor Thrives at High Temperatures," Chemical Engineering, Oct. 27, 1975, by Nicholas R. Iammartino.

"Destruction of PCB-Contaminated Soils with a High-Temperature Fluid-Wall Reactor," by Arthur Hornig.

"Decomposition of Chlorinated Hydrocarbons Using a Novel High Temperature Fluid Wall Reactor," by A. W. Hornig.

"Destruction of PCB on PCB-Contaminated Soils with a High-Temperature Fluid-Wall Reactor," by A. W. Hornig and E. Matovich, Dec. 22, 1982.

"Thermal Destruction of Chlorinated Hydrocarbons with a High-Temperature Fluid-Wall Reactor," by A. W. Hornig and E. Matovich, Mar. 30, 1983.

"Studies in High-Temperature Fluid-Wall Reactors: I. Reactions of Hydrocarbonaceous Materials," by E. Matovich.

(List continued on next page.)

Primary Examiner—Robert Kunemund
Attorney, Agent, or Firm—McAndrews, Held & Malloy, Ltd.

[57] ABSTRACT

A method is described for photochemically decomposing organic materials into hydrogen gas and elemental carbon, preferably in the form of carbon black, and to a smaller extent carbon monoxide. The organic materials are induced to decompose primarily and solely through their exposure to a sufficiently intense field of radiant energy, for a sufficient time, in a substantially closed reactor.

12 Claims, 2 Drawing Sheets

OTHER PUBLICATIONS

"Experiments on the Gasification of Black Mesa Underflow Slurry in a High Temperature Fluid Wall Reactor," by E. Matovich, Apr. 14, 1978.

Gasification of Carbon and Organic Substances.

"Reactor Heat Transfer Analysis," by Lee Groenen.

"Scaling and Cost Factors in Toxic Waste Disposal," by E. Matovich, May 23, 1983.

"Waste Generation Reduction—Nitrates FY 1982 Status Report" by L. J. Meile and A. J. Johnson, Jan. 16, 1984.

"Monograph I: Gasification of Coals and Peat in the Thagard High-Temperature Fluid-Wall Reactor," by Thagard Research Corporation, Jun. 23, 1981.

"Dry Pyrolysis of Black Mesa Coal with a High-Temperature Fluid-Wall Reactor," by E. Matovich, Jun. 8, 1981.

"Thermal Destruction of Chlorinated Hydrocarbons with a High-Temperature Fluid-Wall Reactor," by A. Hornig and E. Matovich, Mar. 30, 1983.

"Conceptual Design Study 24-Inch Thagard Gasifier Automotive Recovery Operations Plant," by Stearns-Roger Engineering Corporation, Dec. 1981.

"Engineering Studies on the Flow Behavior of Automized Slurries in Entrained Flow," by E. Matovich, Nov. 24, 1980.

"Hydrogen Generation with the Thagard Reactor," by E. Matovich, Jan. 28, 1981.

"Hundred-Megawatt Power Plant Based on Gasified Coal and Gas Turbines," Mar. 22, 1982.

"Final Report: Preparation of Samples for Processing in the Thagard Reactor," by Fredrick J. Weck Company, May 31, 1979.

"Low-Level Waste Management Program FY-1985 Reduced Waste Generation-Nitrates Preliminary Process Design and Estimate Using a High-Temperature Fluid-Wall Reactor," by E. Matovich, Apr. 19, 1985.

METHOD FOR PHOTOCHEMICALLY DECOMPOSING ORGANIC MATERIALS

BACKGROUND OF THE INVENTION

The present invention relates to methods for decomposing organic materials into hydrogen gas and elemental carbon in the form of carbon black, and to a smaller extent carbon monoxide. More particularly, the present invention is directed to an improved method of processing and converting organic materials, including organic waste materials such as non-pretreated infectious hospital wastes, refinery wastes, paper wastes, food processing wastes, and other similar solid and liquid organic wastes, into carbon, preferably in the form of carbon black, by exposing the organic material to a sufficiently intense field of radiant energy that primarily promotes the chemical reactions resulting in the decomposition of the organic materials into hydrogen and carbon and small amounts of carbon monoxide.

Carbon black is a low density, porous form of carbon. It is used in the fabrication and manufacture of many items including automobile tires and audio and video tapes. Typically, the "bottoms" or waste oil from refineries have been used in the manufacture of carbon black. The conventional manufacturing process requires the use of special reactors, high temperatures and the combustion of fossil fuels. The cost of this manufacturing carbon black has been on the order of twenty cents per pound.

The management of wastes produced by industry, hospitals and homes is an ever growing concern and becoming a crisis. Landfilling, the traditional waste treatment method in the United States, is now considered the method of last choice. Existing landfills are rapidly filling, are leaking and polluting the ground water and are being added to the Super Fund list. As a matter of political reality, it is becoming increasingly difficult to establish new landfills.

Incineration is becoming the waste treatment method of choice for industry. Citizen resistance to incineration, however, is strong and increasing because of the small amounts of toxic, organic chemicals, dioxins and furans, emitted by incinerators and because of the difficulties associated with the operation of incinerators. In addition, incinerators are expensive and their use has always resulted in a large increase in the cost of waste management. As a practical matter, obtaining the required governmental permits for new incinerators is becoming as difficult as obtaining the permits for new landfills.

As the environmental requirements for landfills are increased and the use of incineration increases, the costs for management of wastes is increasing rapidly. Solid waste disposal costs for 1989 increased by a factor of three, compared to 1988, in Pittsburgh and are generally between $50 and $125 per ton in New Jersey and other Northeastern States.

Infectious wastes, as for example those produced by hospitals, are currently receiving much attention because these wastes have been washing ashore on the beaches of New York and New Jersey for the past two summers. Hospitals are paying high prices, $800 or more per ton, to dispose of such wastes. Citizen opposition has stymied, as a practical matter, many hospitals in attempting to install their own incinerator. The Federal Government and many states are beginning to develop regulations over incinerators. A few States regulate infectious wastes as hazardous wastes. This regulation will further increase the costs of disposing of infectious wastes.

In the incineration process, the oxidation of the fossil fuels creates high temperatures and thus high kinetic energies. As a result of inelastic collisions among the molecules, kinetic energy is transformed into the internal energy of the molecules, usually vibrational energy, which causes chemical reactions between the organic material and oxygen to occur.

The Hobbs U.S. Pat. No. 3,648,630 Hobbs and the Hardison U.S. Pat. No. 4,667,609 describe incinerators that used infrared radiation from blackbody radiators to heat solids to promote combustion. These incinerators are similar to fossil fired incinerators in other respects. The Galloway U.S. Pat. No. 4,688,495 employs resistance heaters to heat gases to promote incineration.

The Matovich U.S. Pat. No. 3,933,434 describes the High Temperature Fluid Reactor, a chemical reactor in which the energy required is supplied by radiation. This patented reactor consists of large concentric vertical, annular radiation zones. Inert nitrogen gas flows into and through the radiation zones during operation. Reactant materials are introduced into the top of the reactor and fall vertically through the radiation in the radiation zone to promote the chemical decomposition reactions. Preprocessing of materials into extremely small, fine particles is, however, necessary to control the transit time of the reactant materials through the radiation zone. Subsequent U.S. Pat. Nos. 4,042,334; 4,044,117; 4,056,602; and 4,059,416 disclose refinements without altering the basic fluid wall.

The patented Matovich type reactor promotes decomposition of organic materials into carbon black and hydrogen by "pumping" energy into solid particles using light. The reactor creates the light flux by employing imperfect blackbody radiators, i.e. devices heated to a sufficiently high temperature that they radiate large amounts of radiation. Oxygen is excluded from the Matovich type reactor by the use of a flowing stream of inert nitrogen gas, the fluid wall, throughout the reactor. The reactant materials are at a higher energy level than the nitrogen gases because these materials are far better absorbers of radiation than the nitrogen gas.

Similarly the Westinghouse Electric Corporation has described an electric pyrolyzer system that may be used, at 3000° F. and in a low oxygen or oxygen-free environment, to destroy organic solids, and sludges, and to melt inorganic solids to form a glass-like residue. This system employs a molten glass bath to entrap and remove the residue. See in this regard, the report in the May/June 1988 edition of THE HAZARDOUS WASTE CONSULTANT, especially pages 4–12 through 4–14.

SUMMARY OF THE INVENTION

In its principal aspects, the present invention provides an improved method for converting organic material, and particularly organic materials such as non-pretreated infectious hospital waste, refinery waste, paper waste, food processing waste, and other similar solid or liquid organic wastes into hydrogen and elemental carbon, preferably in the form of carbon black, and carbon monoxide. This improved method employs a substantially closed reactor having an internal reaction chamber or cavity made of materials that can tolerate the presence of oxygen at high temperatures, that possess low thermal mass, that limit or restrict the passage of heat and that may function as almost perfect black bodies at high temperatures. The improved method produces useable carbon black, and thus has the double benefit of eliminating organic waste materials while producing a useful end product in an efficient, economical manner. Organic materials, in the present method, are induced to decompose primarily and solely through their exposure to a sufficiently intense field of radiant energy. As a result of exposure to the radiation field, the energy level of the individual organic molecules is elevated to a sufficiently high level that the large organic molecules are no longer stable and decompose into their constituent atoms and smaller molecules, such as carbon monoxide and hydrogen.

In the improved method of the present invention and in contrast with incineration processes, the organic materials do not react directly with oxygen. The oxygen content in the substantially closed reactor is kept to a minimum by deliberately limiting the amount of air introduced into the reaction chamber with reactant organic materials.

The improved method similarly does not require the use of an inert gas, i.e. nitrogen gas or fluid wall, that is required to be employed in the patented Matovich reactor to protect it from being destroyed as a result of oxidation. In addition and unlike the reactant materials in the Matovich reactor, the reactant materials do not have to be finely ground because they are contained in a reaction chamber and do not have to be passed between and through concentric annular radiation zones. This affords the present invention a significant economic advantage over the Matovich reactor.

Furthermore, reactors for use in connection with the present method can be heated relatively rapidly, in one to two hours, as compared with the Westinghouse system reactor. All the energy needed is furnished by radiant heaters, unlike the Westinghouse system where more than one-half the energy is supplied by the glass bath. These features make the present invention commercially attractive especially to smaller users, such as hospitals and the like, who can practice the improved method at their own facilities.

Lastly, the present method converts all the carbon in the organic materials to carbon black that may then be collected or that may alternatively be further converted through oxidation reactions. Having these options is unique with the present invention.

Accordingly, it is an object of the present invention to provide an improved method of processing and converting organic materials, including organic waste materials such as non-pretreated hospital infectious waste, refinery waste, paper waste, food processing waste, and other similar solid and liquid organic wastes, into predominantly hydrogen and carbon black, with some relatively small amounts of carbon monoxide. A related object of the present invention is to provide an improved method, as described, wherein the organic waste materials decompose solely as a result of their exposure to radiant energy.

Another object of the present invention is to provide an improved method as described which includes the steps of: introducing the organic waste materials into the interior of a substantially closed reactor; exposing the waste materials in the interior of the reactor to a sufficiently intense field of radiant energy for sufficient times such that the organic molecules in the waste materials decompose, primarily and solely as a result of their exposure to the radiant energy, into their elemental atomic particles and smaller molecules including hydrogen, carbon in the form of diffused carbon black powder, and carbon monoxide; and withdrawing the diffused carbon black powder and gases from the interior of the reactor. A further related object of the present invention is to provide an improved method, as described, wherein the waste materials do not have to be pretreated except that they may be shredded into particles of the size sufficient to allow them to be facilely introduced into the reactor. A still further related object of the present invention is to provide an improved method, as described, wherein the interior of the reactor is lined with fibrous ceramic materials that will enable the reactor to be efficiently and readily heated so that reactors of the type required to perform the improved method of the present invention may be installed in and operated efficiently by hospitals.

These and other objects, advantages and benefits of the present invention will become apparent from the following description of the preferred embodiment of the invention, described in conjunction with the accompanying drawings.

DETAILED DESCRIPTION OF THE PREFERRED EMBODIMENT

Figure 1:
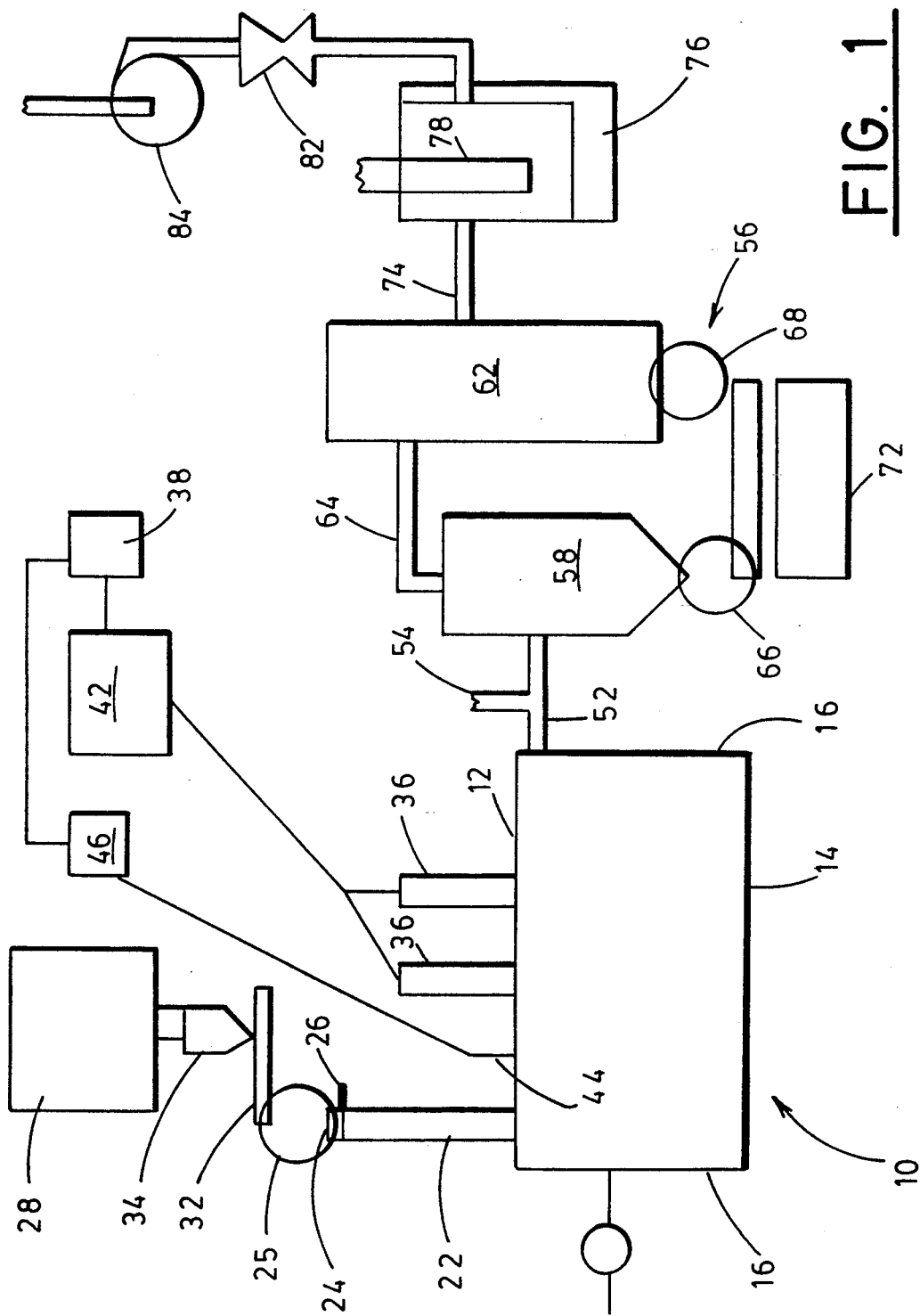
FIG. 1 is a schematic layout view of a reactor system that may be used to produce carbon black from solid or liquid organic materials in accordance with the teaching of the present invention.
Figure 3:
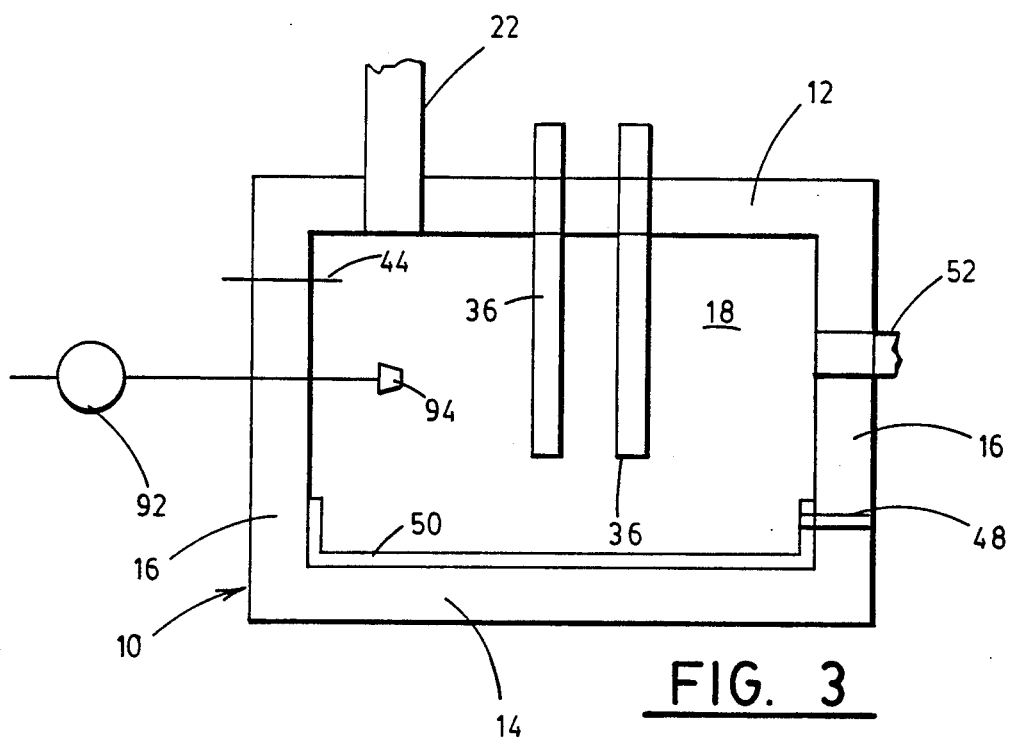
FIG. 3 is a partial, vertical cross-sectional view showing the interior components and arrangement of the reactor used in the reactor system of FIG. 1.

Referring now to FIGS. 1 and 3, a reactor, shown generally at 10, includes a top wall 12, a bottom wall 14 and side walls 16. The walls 12-16 serve to define a substantially closed, internal reaction chamber or cavity 18 within the reactor 10. Both the reactor 10 and its internal chamber 18 are shown, in FIG. 3, as being generally cubic in overall configuration, but their particular configuration or shape is not critical to their performance of the improved method of the present invention.

The walls 12-16 of the reactor 10 are constructed out of fibrous ceramics material. Steel or other such materials, not shown in FIG. 3, are used as an outer reinforcement and for structural strength for the fibrous ceramic materials. The thickness of the walls is chosen to minimize energy loss. The particular materials used to construct the walls and the thickness of the wall are determined by the particular operating temperatures selected for the reactor. For example, if the maximum operating temperature in the chamber is to be 1500° C., the materials forming the chamber 18 should be suitable for temperatures up to 1650° C. or more. With these temperatures, the walls 12-16 preferably should be at least six or more inches thick so that the outer shell temperature of the reactor 10 will be sufficiently low so as not to be a hazard and to reduce energy losses from the reactor. Fibrous ceramics materials that may be used for this purpose include those marketed by Industrial Insulation Inc. of City of Industry, Calif. under the designation MaxFire Board.

The reactor 10 may be used to process a variety of different types of organic materials. These materials can include waste materials such as infectious hospital wastes, refinery wastes, paper wastes, food processing wastes and other similar solid or liquid organic wastes. Preferably the waste materials should contain 95% or greater organic matter, but the improved method will satisfactorily decompose materials containing larger amounts, for example, on the order of 20%, of inorganic matter. The solid waste materials may be in a variety of assorted sizes and shapes. The materials need not be pre-treated, that is, they can be processed as they are received from their sources except as explained below, the materials may have to be roughly shredded or broken down to a size and shape that can be readily introduced into the reactor.

When these materials are in solid form, a vertically oriented feed chute 22 may be used to introduce or feed them into the reaction chamber 18. The chute 22 is generally cylindrical in shape. Its lower end opens directly into the chamber 18, and its upper end is normally closed by a removable cover plate 24. To conserve energy and to trap radiant energy within the reactor, the length of the chute 22 is more than four times its diameter. The walls of the chute are constructed of fibrous ceramic material such as those marketed by Industry Insulation Inc. of City of Industry, Calif. under the designation MaxFire.

A conventional, steel knife valve 26 is mounted within the chute 22 and is used to control the feeding of waste materials into the chamber 18. An example of such a valve is the Meyer Slide Gate marketed by William W. Meyer & Sons, Inc. of Skokie, Ill. If the continuous feeding of waste materials is desired, a rotary valve 25 may be used. An example of such a rotary valve is the "Meyer's Rolo-Flo" valve marketed by William W. Meyer & Sons, Inc. of Skokie, Ill. Whatever type of valve or assembly is utilized, the introduction of oxygen into the chamber 18 through the feed chute should be restricted so as to minimize, to the extent practicable, having unwanted oxidation occurring in the chamber 18.

The solid materials to be processed are stored in a conventional storage bin 28 and may be loaded into the chute 22, without any pre-treatment, by means of a conventional conveyor 32, such as a screw feeder. After the chute 22 is loaded, the cover 24 is again placed over the upper end of the chute and the valve 26 is opened. If all or part of the waste materials are too bulky to fit easily within the chute 22, they may be roughly reduced in size by a conventional shredder shown generally at 34.

A plurality of conventional radiant heaters 36, such as electrical resistance heaters, two of which are shown in FIGS. 1 and 3, are mounted in the top wall 12 of the reactor 10 and hang from that wall into the chamber 18. The size and number of the heaters 36 is determined by the size and the desired processing rate of the reactor 10. The particular orientation of the heaters is inconsequential. In this regard, the heaters 36 must, however, supply a sufficiently intense field of radiant energy needed to maintain the reactor 10 at operating temperature and to drive the desired chemical reactions.

The size of the reactor 10, its wall thickness, the size of the chamber 18, and the particular fibrous ceramic materials used will be determinative of the energy needed to maintain the reactor at any given temperature. Ultimately the choice of heaters 36 is based on economic considerations and the operating temperatures required for the particular material or materials being processed. Specifically, however, the heaters 36 need to have the capacity to be able to heat the chamber 18 to temperatures between around 1100° C. and around 1500° C. and preferably around 1260° C. Heaters having this capacity include the model "Kanthal Super ST" marketed by The Kanthal Corp. of Bethel Connecticut.

With respect to decomposing organic materials, it is known that under appropriate conditions organic molecules will decompose into their constituent atoms. Decomposition of organic molecules occurs in the absence of reactive species, including oxygen, and when the energy of the molecules is sufficiently high that the molecules are not stable. In high energy states, the molecular form becomes less stable than the state in which the individual atoms are not associated with other atoms.

In large, complicated organic molecules, all of the various forms of internal energy are coupled to each other. Thus, rotational energy, vibrational energy, and electronic energy are coupled and interchanges occur. Kinetic energy is coupled to the internal energies via inelastic collisions among the molecules. The interchange of kinetic energy with internal energies occurs more slowly and less efficiently than interchange of energy among the various kinds of internal energy.

A common method of achieving high energy levels is to raise the kinetic energy of the molecules. Temperature is a direct measure of the kinetic energy. The combustion of fossil fuels or organic materials is commonly used to produce the kinetic energy required to achieve high temperatures. Energy transfer in such reactors is predominantly via convection, the movement of gases, and collisions among particles. Energy is exchanged among the various gases components as a result of collisions. All of the materials within such a reactor are heated to the same temperature in this manner.

Electrically powered resistance heaters, such as the heaters 36, produce heat by the interaction of the electrical current with the materials. The amount of current flow and the properties of the material, in particular the electrical resistance, determine the energy produced. At relatively low temperatures, below 1000° C., the energy is removed from these heaters through the interaction with gases. At higher temperatures, the heaters radiate energy as light and approach the behavior of black body radiators.

The theory of black body radiators is known. The energy radiated is governed by the Stefan-Boltzmann equation $$M = cT^4$$

where c is Stephan's constant, M is the power radiated, and T is the absolute temperature. The spectral distribution of the radiation is given by Planck's law $$m = C/(L^5(exp(K/LT) - 1))$$

where C and K are constants, L is the wavelength of the radiation, T is the absolute temperature, and m is the power radiated per unit area at the wavelength L. The maximum monochromatic emissivity is given by Wien's law $$L^*T = W$$

where L is the wavelength at which the maximum energy is radiated, T is the absolute temperature, and W is a constant.

As is apparent from the Stefan-Boltzmann equation, the radiated energy is proportional to the fourth power of the absolute temperature and thus increases rapidly with temperature. At temperatures about 1100° C., radiant energy transfer is larger than energy transfer by natural convection. Radiant energy transfer is very fast since the energy is carried by light and occurs between any two objects visible to each other.

At the temperatures discussed above, that is, temperatures in the range of around 1100° C. to around 1500° C., the walls of the reaction chamber 18 may radiate light with an efficiency of about ninety-three percent. Thus, at these temperatures an intense radiation field permeates the chamber even when the heaters 36 are not operating. This radiation field is primarily infra-red light and preferably, should have a density of forty or more watts per cubic centimeter.

As organic materials are fed into the chamber 18, they are immediately within this intense radiation field. The characteristics of the radiation field are determined by the Stefan-Boltzmann, Planck and Wien equations. Infra-red radiation does not interact strongly with gases but does interact with solid materials. Its energy is absorbed by the solids and is transferred to internal energies. When sufficient energy is absorbed by the individual organic molecules, unimolecular decomposition of the organic molecules into atoms occurs.

Organic molecules decompose into carbon, hydrogen, and small amounts of other elements. The carbon typically forms as a porous solid powder although some of the carbon will subsequentally react to form carbon monoxide because as a practical matter, a limited amount of oxygen is introduced into the chamber with the organic materials. The introduction of this oxygen is not desired and as noted above, should be limited as much as practicable. The reason for this is that pursuant to the method of this invention, the decomposition of the waste materials should, to the extent practicable, be due to the radiant energy; not as a result of oxidation reactions.

Electrical current is supplied to the heaters 36 via a conventional power controller 38 and a transformer 42. The amount of current is controlled so as to maintain a preselected temperature in the chamber 18. Temperature may be measured within the chamber 18 by a conventional temperature measuring thermocouple or alternatively infrared device 44. The signal from the thermocouple 44 is directed to the temperature controller 46 which in a conventional manner interprets the information and provides an appropriate signal to the power controller 46. Electrical current, as directed by the power controller 38 is supplied to the heaters 36 via the transformer 42. The transformer 42 is selected to provide the voltage to suit the characteristics of the particular heaters 36 used and the particular wiring configuration. Kanthal Super ST heaters are low resistance, high current heaters. If connected in parallel, such heaters use voltages between 10 and 20 volts and currents between 150 and 275 amperes to achieve the above noted temperatures.

As discussed above, the organic materials are converted in the chamber to carbon black and other atoms or small molecules, such as hydrogen and carbon monoxide. If inorganic materials, such as steel needles or staples, are included in the material being processed, the above noted operating temperatures in the reaction chamber 18 are below the melting point of these inorganic materials. These then will form a residue on the bottom of the chamber. This residue is, in turn, removed periodically through a specially provided port 48.

To facilitate removal of low melting inorganic materials that may be included in the materials being processed, a liner 50 is provided in the bottom of the chamber. This liner 50 must be resistant to corrosion by the molten inorganic materials. One such material is aluminum nitride, which can be formed into one piece inserts. With large amounts of molten materials, an overflow is provided with a conventional control valve, not shown, similar to that provided in glass furnaces. With small amounts of molten materials, the liner 50 and surrounding materials may be made to be removable so as to serve as a disposable container.

Alternately, if the operating temperature is increased, the steel will melt. In this case, the liner 50, as described above, will also be used to collect the molten materials.

As discussed above, the carbon typically forms as a porous solid. It passes out of the chamber 18 with the gases through a conduit 52. Upon exiting the chamber, air is added through a port 54 in the conduit 52 to cool the gases before they pass through the rest of the system. The carbon black is collected in a conventional cyclone and filter system shown generally at 56. Specifically, this system 56 includes a conventional cyclone or cyclones 58 and a conventional filter 62 that interconnect, via a conduit 64, so as to permit gases to flow from the cyclone(s) 58 to the filter 62. Carbon black collected in the cyclone(s) 58 and filter 62 pass through rotary valves 66 and 68, respectively, into a storage bin 72. The gases pass from the filter 62 to the chamber 58 by means of a conduit 74.

The other remaining gases pass from the filter 62 into and through a secondary reaction chamber 76. The gases are heated in that chamber 76, by a conventional heater 78, to a sufficient temperature to oxide any remaining carbon, carbon monoxide, and hydrogen.

A conventional scrubber 82 is provided downstream of the chamber 76 to remove any acid gases that may have been formed in that chamber. A conventional fan 84, located downstream of the scrubber 82, moves the gases into the atmosphere and maintains the chambers under negative pressure.

Figure 2:
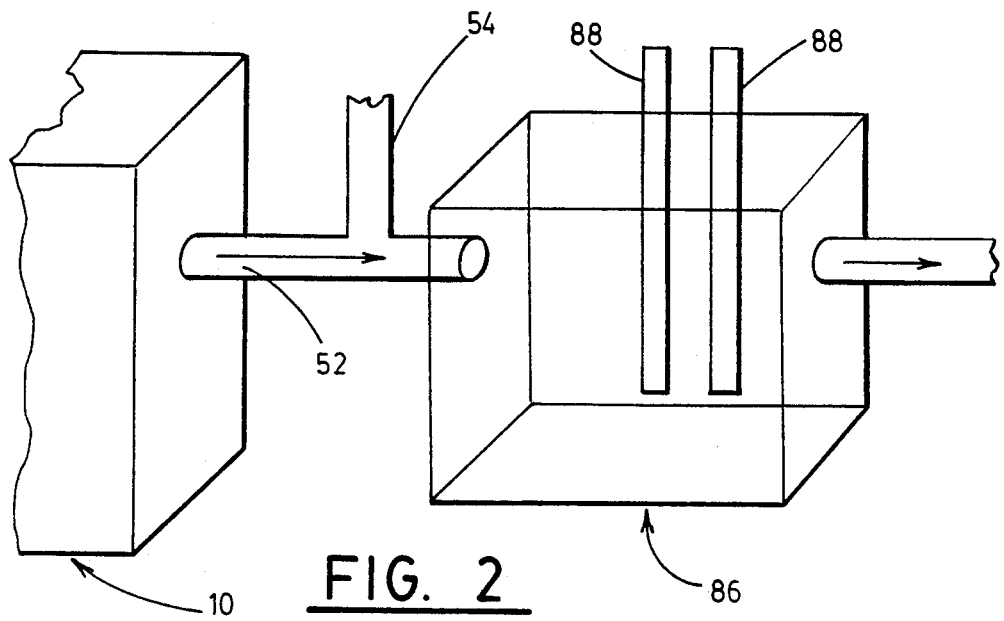
FIG. 2 is a partial schematic layout view of a reactor system that may be used to produce carbon dioxide.

Alternatively and in small installations designed to eliminate organic wastes, all of the carbon produced in the reaction chamber 18 may be oxidized into carbon dioxide in a conventional secondary reactor 86, as shown in FIG. 2. The additional energy needed to oxidize is supplied by conventional electrical resistance heaters 88. The temperature in this reactor 86 is maintained high enough such that the complete oxidation of carbon black occurs, that is, greater than 550° C. The exhaust gases from the reactor 86 pass to and through a conventional scrubber and fan such as the scrubber 82 and fan 84.

If carbon black is to be produced from a liquid organic material, a conventional pump 92 is used to move this organic material into the reaction chamber 18. A conventional nozzle 94 may be used to disperse this liquid feed material, but the particle size of the spray cannot be small, as the particles of liquid must absorb infrared radiation. In this regard, the spray particles should be at least 100 microns in size. In all other aspects, the reactor 10 and downstream system 56 in the system function identically as when the feed material is solid.

The preferred embodiment of the present invention has now been described. This preferred embodiment constitutes the best mode presently contemplated by the inventor for carrying out his invention. Because the invention may be copied without copying the precise details of the preferred embodiment, the following claims particularly point out and distinctly claim the subject matter which the inventor regards as his invention and wishes to protect.

I claim:

1. An improved method of recycling solid and liquid waste compound primarily or organic materials into useful, recoverable substances, predominantly hydrogen gas and solid carbon in a diffused powder form, by essentially completely decomposing the organic materials to their elemental components in a reactor having a substantially closed internal reaction chamber with interior walls being made of materials that possess low thermal mass, that limit the passage of heat, and that may function as almost perfect black bodies at high temperatures, and with the internal chamber having controlled-access first and second openings, the improved method comprising the steps of:

supplying sufficient energy to the interior of the reaction chamber so that the reaction chamber is at a sufficiently high energy level, as indicated by temperature in the range of about 1100°-1500° C., to cause the interior walls of the reaction chamber to emit black-body radiation;

generating an intense radiation field in the reaction chamber, composed primarily of infrared radiation, as a result of radiative emissions from the interior walls of the reaction chamber and from resistive heating elements;

introducing the organic waste materials to be decomposed through the first opening into the reaction chamber of the reactor to expose the organic waste materials to the intense radiation field present long enough so that the organic waste material decompose primarily solely be absorbing sufficient energy from the intense radiation field into their elemental constituents, including solid carbon and hydrogen gas;

withdrawing the diffused carbon powder and gases, including hydrogen gas, from the reaction chamber of the reactor through the second opening of the reactor;

mixing air with the diffused solid carbon and gases as they are withdrawn from the reactor so as to cool them; and collecting the carbon powder.

2. The improved method of claim 1 wherein the organic materials are solid organic waste materials such as infectious hospital wastes, refinery wastes, paper wastes, food processing wastes and other similar solid organic wastes primarily in the form of solid pieces having various and assorted sizes; wherein the first opening includes a feed chute having a length at least four times its diameter or direction changes so as to retain the radiant energy within the chute; and wherein the improved method further includes the step of reducing the size of the waste materials, if need be, to a size that can be accommodated in the chute before the waste is introduced into the reaction chamber of the reactor through the chute.

3. The improved method of claim 2 wherein the waste material includes inorganic materials; wherein the reactor includes a bottom portion; and wherein the improved method includes the steps of collecting any inorganic materials, that may be introduced into the reactor with the organic waste materials, in its bottom portion; and periodically removing the collected inorganic materials from the reactor.

4. The improved method of claim 1 wherein the radiation field has a density of forty or more watts per cubic centimeter.

5. The improved method of claim 2 wherein the portions of the walls of the reactor, that define its reaction chamber, are made of fibrous ceramics; and wherein the thickness of these walls is at least six inches so as to minimize energy loss.

6. The improved method of claim 1 wherein the waste materials are in the form of a liquid; and wherein the improved method includes the steps of pumping the liquid waste materials to the reactor; and spraying the liquid waste materials into the reaction chamber of the reactor.

7. The improved method of claim 2 comprising in addition the steps of introducing the cooled gases and air into an interior chamber of a second reactor; heating the interior chamber of the second reactor to oxidize the hydrogen, carbon monoxide and any remaining carbon into oxidized products; withdrawing the oxidized products from the interior chamber of the second reactor; and scrubbing the oxidized products to remove any acid gases therefrom.

8. The improved method of claim 3 wherein the radiation field has a density of approximately forty or more watts per cubic centimeter.

9. The improved method of claim 1 wherein the temperature in the range of about 1100° C. to about 1500° C. is maintained in the reaction chamber during the decomposition of the materials.

10. The improved method of claim 8 wherein the temperature in the range of about 1100° C. to about 1500° C. is maintained in the reaction chamber during the decomposition of the materials.

11. The improved method of claim 10 wherein the portions of the walls of the reactor that define its reaction chamber are made of fibrous ceramics; and wherein the thickness of these walls is at least six inches so as to minimize energy loss.

12. The improved method of claim 11 including the steps of introducing the cooled gases and air into an interior chamber of a second reactor; heating the interior chamber of the second reactor to oxidize the hydrogen, carbon monoxide and any remaining carbon into oxidized products; withdrawing the oxidized products from the interior chamber of the second reactor; and scrubbing the oxidized products to remove any acid gases therefrom.

* * * * *